Figures 1, 2:
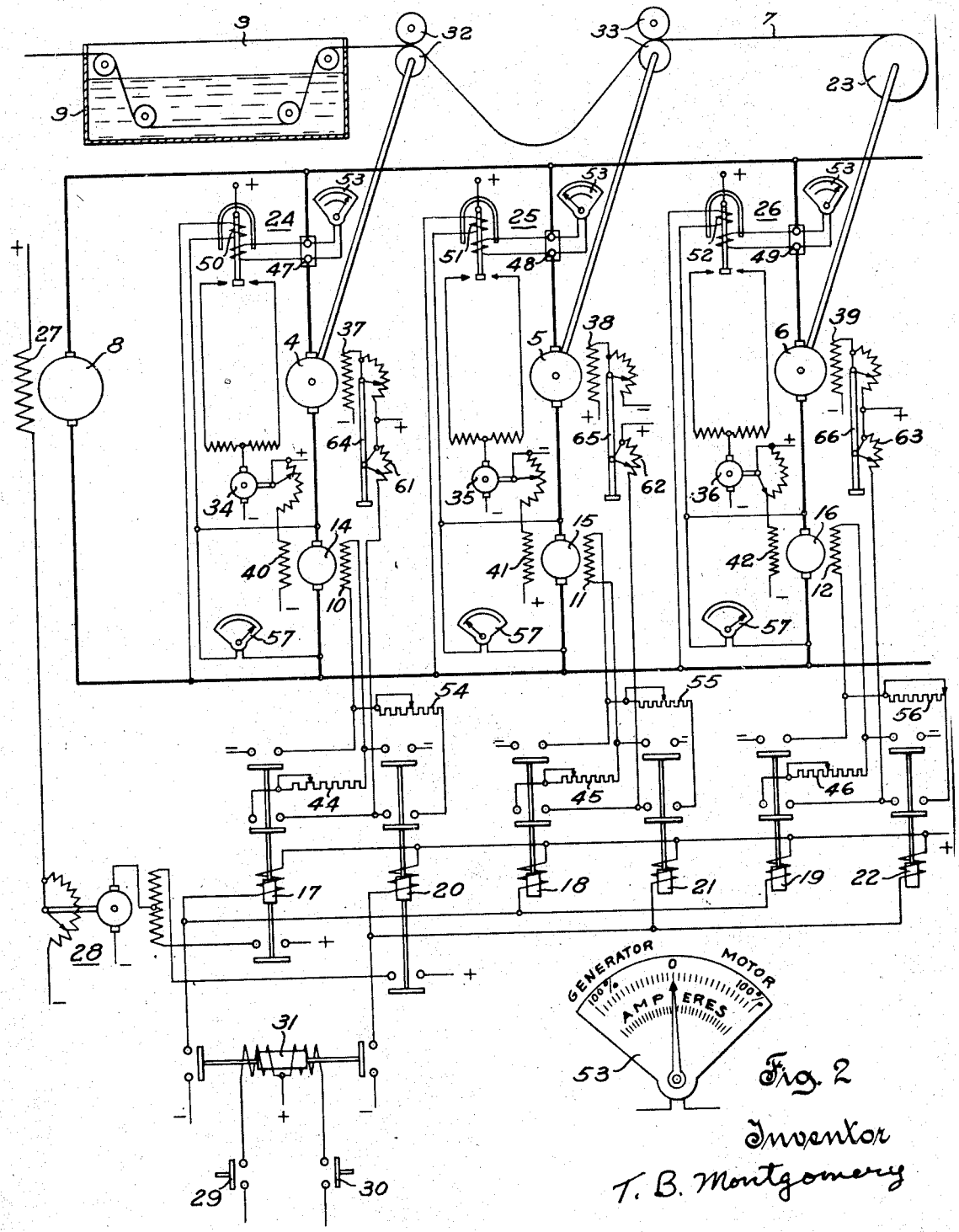

April 6, 1943.  T. B. MONTGOMERY  2,315,869
CONTROL SYSTEM AND METHOD
Filed Nov. 21, 1941

Inventor
T. B. Montgomery
by Harold S. Silver
Attorney

Patented Apr. 6, 1943

2,315,869

UNITED STATES PATENT OFFICE 2,315,869

CONTROL SYSTEM AND METHOD

Terryl B. Montgomery, Wauwatosa, Wis., assignor to Allis-Chalmers Manufacturing Company, Milwaukee, Wis., a corporation of Delaware Application November 21, 1941, Serial No. 419,890

10 Claims. (Cl. 172—239)

This invention relates in general to control systems for a plurality of dynamo-electric machines operating at related speeds and connected to the same voltage source. This invention relates particularly to a system for controlling dynamo-electric machines of the above type so as to properly compensate for the armature resistance voltage drop in each machine, so that these machines may be accelerated and decelerated in concert and their relative speeds accurately maintained.

In prior art control systems where a plurality of dynamo-electric machines are connected to the same voltage source, accurate maintenance of relative speed especially during periods of acceleration and deceleration has not been feasible. If the machines are variously loaded, with one or more machines operating as generators feeding current back to the voltage source and others operating as motors, a change in the main generator voltage, to which all the machines are connected, causes different IR drops in the various machines. The relative currents through these machines are therefore changed and the relative speeds thereof are not maintained. This lack of maintenance of relative speed is a great disadvantage when the dynamo-electric machines are connected through devices operating on various parts of a length of strip material. This is especially true when a constant tension or slack is desired in various parts of a length of strip of material.

It is therefore an object of the present invention to provide a control system which will avoid the above disadvantages.

It is also an object of the present invention to provide a control system for a plurality of dynamo-electric machines whereby their relative speeds can be accurately maintained during acceleration and deceleration of all the machines together when such machines are connected to the same source of voltage.

Objects and advantages other than those above set forth will be apparent to those skilled in the art when read in connection with the accompanying drawing, in which:

Fig. 1 is a schematic diagram of connections illustrating the present invention; and Fig. 2 illustrates a meter that may be used in the embodiment of the invention shown in Fig. 1.

In the drawing an illustrative embodiment of the invention is shown in connection with a strip cleaning line. A strip of material 7 is pulled through a cleaning bath in the tank 9 by the pinch rolls 32. The strip is reeled on reel 23 and is tensioned by tensioning rolls 33. Dynamo-electric machines 4, 5 and 6 are connected to the pinch rolls 32, the tensioning 33 and the reel 23 as shown. As the strip 7 is being wound on the reel 23, the machines 4 and 6 are acting as motors and the machine 5 is acting as a braking generator tensioning the strip 7 between the rolls 33 and the reel 23.

The machines 4, 5 and 6 are all energized from a main generator 8, the voltage of which is varied by varying the current in field 27 to vary the speed of the strip 7. The field current is varied by operation of the motor operated rheostat 28. The rheostat 28 is energized to raise the voltage of the generator 8 by operation of the "raise" push button 29 which energizes relay 31 to close its left hand contacts. This energizes relay 17 which closes a circuit to the motor of rheostat 28 so that it rotates in a direction to increase the current in field 27 and to increase the voltage of the generator 8.

In series with the dynamo-electric machines 4, 5 and 6 across the main generator bus are auxiliary generators 14, 15 and 16, respectively. These auxiliary generators have a two-fold function. The excitation of each of these auxiliary generators is accurately controlled either manually or automatically to supply to the armature circuit of its main machine, a voltage just equal to the voltage consumed in armature resistance in the main machine. The second function of the machines 14, 15 and 16 is to supply accurately the needed compensation to overcome inertia during acceleration or deceleration of the strip 7.

Considering the operation of the machines 4 and 14 as an example, it is found that accurate speed control will be maintained if the counter E. M. F. of the machine 4 is at all times maintained equal to the voltage in generator 8. This is obtained by having the machine 14 supply all added voltage necessary to overcome the armature resistance of machine 4, and also the voltage necessary to accurately supply the current added or subtracted to compensate for inertia during acceleration or deceleration.

If the value of current in the field 40 of the machine 14 is set so that at any given load current through the machines, the machine 14 will supply the armature resistance or the IR drop of both machines, this relationship may be maintained by varying the excitation of the machine 14 exactly in accordance with current variation through the machine 4. This is true for the armature resistance drop varies directly with the current.

This control of the machine 14 may be effected manually by having a meter, such as is shown in Fig. 2 connected across a shunt 47 carrying current proportional to that in the machine 4. This meter is shown as having two scales thereon with its zero point in the middle of the scale. If the current being measured is from a generator such as 5, the indicator will move to the right as the current increases. Conversely, if the machine is the motor 4, the indicator will move to the left as current increases.

A meter 57 having a scale similar to the top scale of the meter 53, is connected across the terminals of the auxiliary generator 14. An operator may thereby inspect the meter 53 connected across shunt 47, and manually control the field rheostat 34 until the meters 53 and 57 agree. When the meters agree the auxiliary generator 14 will be supplying only the voltage necessary to overcome the resistance drop in the machines 4 and 14, and the counter E. M. F. of machine 4 is exactly equal to the voltage of generator 8.

The excitation of the auxiliary generator 14 to automatically perform the above function, is effected by means of a regulator 24 having one coil thereof connected across the shunt 47. A second coil 50 opposing the first coil is connected across the terminals of the auxiliary generator 14. The contacts of the regulator 24 connect the motor operated rheostat 24 to run in one direction or the other to increase or decrease the current in field 40 until the voltage supplied by the machine 14 is in exact accordance with the current flowing in the dynamo-electric machine 4.

It may be desirable to avoid the necessity of contacts and other moving parts utilized in regulator 50 and rheostat 34 and provide any equivalent means of excitation for the machine 14. This may be effected by substituting for field 40, differential fields energized by the shunt 47 and the voltage across machine 14, respectively, and the same result obtained.

The machines 5 and 6 are similarly controlled by controlling the excitation of the auxiliary generators 15 and 16. In the case of the machine 5, the field 38 thereof is reversed and the field 41 of the dynamo-electric machine 15 is reversed, as the machine 5 is running as a braking generator rather than as a motor. The machine 6 illustrates a machine the speed of which must change in a prescribed manner relative to the speeds of the machines 4 and 5, in that the machine 6 is connected to the winding reel. Any suitable regulator may be used for maintaining a constant power output of machine 6 proportional to speed of strip 7 independently of reel build up.

Accurate compensation for inertia, when accelerating or decelerating the strip 7, is highly important in a system of this type. A predetermined percentage of full load current, accurately calculated or measured, is further added or subtracted by the auxiliary machines 14, 15 and 16 during acceleration and deceleration. The accelerating resistors 44, 45 and 46 are accurately calculated and, if desired, can be checked by measurement, to give the percentage of full load current required to compensate for inertia during acceleration when connected in circuit with fields 10, 11 and 12 across the constant voltage source. This accelerating voltage will be added by the machines 14 and 16, as the machines 4 and 6 are motors, and will be subtracted by the machine 15, as the machine 5 is a generator.

The values of the accelerating resistors 44, 45 and 46 will be different as the machines 4, 5 and 6 operate at different speeds and at different values of full load current. The values of the accelerating resistors are changed for any relative change in speed of machines 4, 5 and 6 that may be made by movement of the speed setting rheostats 64, 65 or 66. Movement of this rheostat varies the excitation of the machine 4, for example, by means of field 37, and varies the amount of current through the accelerating resistor 44 by means of a resistor 61. This is important as it permits accurate changing of the $WR^2$ or inertia compensation with a change in speed, thereby insuring that the counter E. M. F. of the main machines is exactly equal to the voltage of generator 8 even during acceleration and deceleration.

When the strip 7 is to be accelerated and relay 31 picks up its left hand contacts, the relay 17 is energized to operate the motor operated rheostat 28 as previously explained. Accelerating relays 18 and 19 are connected in parallel with relay 17 and are therefore simultaneously energized. The contacts on the upper part of the relays 17, 18 and 19 connect the fields 10, 11 and 12 of the auxiliary generators in circuit with the accelerating resistors 44, 45 and 46 and their respective speed setting resistors 61, 62 and 63.

Thus, as the speed of strip 7 is being raised by raising the voltage of generator 8, an added accurate percentage of full load current of machines 4, 5 and 6 is added to the machines 4 and 6 and subtracted from the machine 5. Thus the relative speeds of the machines 4, 5 and 6 is accurately maintained during acceleration as well as during load change at constant speed, and the prescribed tension and slack easily maintained.

Upon decreasing the speed of the strip 7, decelerating resistors 54, 55 and 56 are similarly connected in circuit with the fields 10, 11 and 12 to properly compensate for the inertia of the strip. These resistors may be set at different values from those of the acceleration resistors. For example, the resistors 44, 45 and 46 may be set to compensate for inertia during acceleration of the strip 7 to full speed in twelve seconds and the resistors 54, 55 and 56 may similarly compensate for deceleration of the strip 7 in six seconds.

As examples of compensation upon acceleration and deceleration of the various machines in a cleaning line of the above type, it was found that while twenty-eight percent, twenty-six percent and fifty percent of full load currents of the machines 4, 5 and 6 were necessary to compensate for acceleration, fifty-five percent, fifty percent and two hundred percent full load currents were required to compensate for deceleration. The need for accuracy is therefore apparent.

The present invention provides smooth and accurate speed variation of the multiple drive machines with a very simple control which may be manual or automatic. The relative speeds of the various machines may be maintained during relatively varying loads and during speed change and hence the speed of the strip can be changed by generator voltage variation without looping or breaking the strip. By controlling the armature resistance compensation, provided by the auxiliary generator, in exact accordance with the current through the machines, rather than in accordance with the speed of the machine, an accurate compensation is obtained.

The present invention includes the improved method of providing exact IR drop compensation by comparing, manually or automatically, the current through the main machine and the voltage across the auxiliary machine, and controlling the excitation of the auxiliary machine so that such current and voltage have predetermined relative values.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. A control system comprising a plurality of dynamo-electric machines connected to a voltage source, means for varying the voltage of said source, a plurality of auxiliary dynamo-electric machines, each of which is connected in series with one of said dynamo-electric machines across said voltage source, means responsive to the energization of said voltage varying means for varying the excitation of said auxiliary dynamo-electric machines, said variation being proportional to the percentage of full load current necessary in said dynamo-electric machine to compensate for inertia upon acceleration of said machine, and means for varying the excitation of said auxiliary dynamo-electric machines in accordance with the voltage across said auxiliary dynamo-electric machines and in accordance with the current in said dynamo-electric machines.

2. A control system for a first and a second dynamo-electric machine connected in parallel across the same voltage source, means for varying the voltage of said source, means for insuring that the counter E. M. F. of each of said dynamo-electric machines is equal to the voltage of said source, said means comprising a first auxiliary dynamo-electric machine connected to said first dynamo-electric machine and a second auxiliary dynamo-electric machine connected to said second dynamo-electric machine, said means further comprising means for controlling the excitation of said auxiliary dynamo-electric machines responsively to the current through said dynamo-electric machines and the voltage across said auxiliary dynamo-electric machines.

3. A control system for a plurality of dynamo-electric machines connected to a voltage source, means for simultaneously varying the speeds of said dynamo-electric machines in concert, means for supplying additional current of a predetermined value and direction to said dynamo-electric machines during operation of said speed varying means, means for varying the relative speeds of said dynamo-electric machines, and means operatively responsive to operation of said relative speed varying means for varying said predetermined value of said additional current.

4. A control system for a plurality of dynamo-electric machines connected to a voltage source, means for simultaneously varying the speeds of said dynamo-electric machines in concert, means for supplying additional current of a predetermined value and direction to said dynamo-electric machines during acceleration thereof, means for supplying additional current of a different predetermined value and direction to said dynamo-electric machines during deceleration thereof, means for varying the relative speeds of said dynamo-electric machines, and means operatively responsive to operation of said relative speed varying means for varying said predetermined values of said additional current.

5. A control system for a plurality of dynamo-electric machines connected to a voltage source, means for varying the voltage of said source, means for supplying additional current to said dynamo-electric machines during operation of said voltage varying means to compensate for inertia encountered by said machines, means for varying the relative speeds of said machines, and means operatively responsive to operation of said relative speed varying means for varying the amount of said inertia compensation.

6. In a control system for a dynamo-electric machine and an auxiliary dynamo-electric machine in series across a voltage source, the method of maintaining the counter E. M. F. of said dynamo-electric machine equal to said source, independently of variation of load current in said dynamo-electric machine, comprising visually comparing said load current and the voltage across said auxiliary dynamo-electric machine and varying the excitation of said auxiliary dynamo-electric machine until such current and voltage reach predetermined relative values.

7. In a system for maintaining relatively different values of tension in predetermined parts of a moving strip of material, a plurality of dynamo-electric machines, means for mechanically connecting one of said dynamo-electric machines to one said predetermined parts of said strip, means for connecting another of said dynamo-electric machines to another of said predetermined parts of said strip, means for connecting said dynamo-electric machines across a voltage source, means for varying said voltage source to vary the speed of said strip, and means for maintaining the counter E. M. F. of said dynamo-electric machines equal to the voltage of said source independently of load current change, said means comprising a plurality of auxiliary dynamo-electric machines, one of which is connected in series with said one of said dynamo-electric machines and another of which is connected in series with said another of said dynamo-electric machines, said means further comprising means for varying the excitation of said auxiliary dynamo-electric machines in accordance with the current therethrough and the voltage thereacross.

8. In a system for maintaining relatively different values of tension in predetermined parts of a moving strip of material, a plurality of dynamo-electric machines, means for mechanically connecting one of said dynamo-electric machines to one said predetermined parts of said strip, means for connecting another of said dynamo-electric machines to another of said predetermined parts of said strip, means for connecting said dynamo-electric machines across a voltage source, means for varying said voltage source to vary the speed of said strip, means for maintaining the counter E. M. F. of said dynamo-electric machines equal to the voltage of said source independently of load current change, said means comprising a plurality of auxiliary dynamo-electric machines, one of which is connected in series with said one of said dynamo-electric machines and another of which is connected in series with said another of said dynamo-electric machines, said means further comprising means for varying the excitation of said auxiliary dynamo-electric machines in accordance with the current therethrough and the voltage thereacross, and means operatively responsive to operation of said voltage varying means for varying the excitation of said auxiliary dynamo-electric machines to compensate said dynamo-electric machines for inertia involved in varying the speed of said strip.

9. The invention defined in claim 7 wherein said one dynamo-electric machine is a motor and said another dynamo-electric machine is a generator.

10. The invention defined in claim 8 wherein said one dynamo-electric machine is a motor and said another dynamo-electric machine is a generator.

TERRYL B. MONTGOMERY.